(12) United States Patent
Ripley

(10) Patent No.: US 6,450,738 B1
(45) Date of Patent: Sep. 17, 2002

(54) CUTTING FLUID DISTRIBUTOR FOR MILLING CUTTERS

(75) Inventor: Frank R. Ripley, Machesney Park, IL (US)

(73) Assignee: Ingersoll Cutting Tool Company, Rockford, IL (US)

( * ) Notice: Subject to any disclaimer, the term of this patent is extended or adjusted under 35 U.S.C. 154(b) by 25 days.

(21) Appl. No.: 09/779,867

(22) Filed: Feb. 8, 2001

(51) Int. Cl.⁷ .............................. B23C 5/20; B26D 1/14
(52) U.S. Cl. ............................ 407/35; 407/43; 407/53
(58) Field of Search .................. 407/35, 30, 33, 407/34, 43, 11, 53, 120; 409/230, 231, 232

(56) References Cited

U.S. PATENT DOCUMENTS

| | | | |
|---|---|---|---|
| 2,975,507 A | | 3/1961 | Wilder |
| 3,597,817 A | * | 8/1971 | Whalley ..................... 407/11 |
| 3,798,726 A | * | 3/1974 | Dudley ........................ 407/11 |
| 3,811,163 A | | 5/1974 | Frederick et al. |
| 3,899,814 A | | 8/1975 | Kralowetz |
| 4,456,408 A | | 6/1984 | Glasow |
| 5,288,186 A | * | 2/1994 | Kovacevic .................. 409/131 |
| 5,290,135 A | | 3/1994 | Ball et al. |
| 5,542,791 A | * | 8/1996 | Ball et al. ..................... 407/21 |
| 6,053,672 A | * | 4/2000 | Satran et al. ................. 407/40 |

* cited by examiner

Primary Examiner—Henry Tsai
(74) Attorney, Agent, or Firm—Fitch, Even, Tabin & Flannery

(57) ABSTRACT

The cutting fluid distribution system disclosed is one in which the cutting fluid passages which carry the cutting fluid from a pressurized source to the cutting bits of a rotary milling cutter are incorporated into the cutter in a way to be formed in large part by the mere assembly of the constituent elements of the cutter.

9 Claims, 5 Drawing Sheets

CUTTING FLUID DISTRIBUTOR FOR MILLING CUTTERS

BACKGROUND OF THE INVENTION

This invention relates to milling cutters, and particularly to a system for delivering cutting fluid from a pressurized source in a machine spindle to the multiple cutting edges of a rotary milling cutter such as, but not necessarily limited to, a face mill.

In the past, it has been common to carry cutting fluid to the multiple cutting sites of the rotary tool through conduits drilled in the body of the cutter. Apart from difficulty of manufacture, such systems are subject to clogging of the drilled passages as well as to differential distribution of the cutting fluid if the conduits are not carefully designed and made, and maintained.

These problems are addressed in the cutter of the invention by incorporating the cutting fluid distribution system into the design of the cutter in a way such that it is formed merely by the assembly of the constituent elements of the cutter body and is completely opened for inspection and maintenance as an incident to the disassembly of the cutter body.

SUMMARY OF THE INVENTION

In the cutter of the invention, the distribution paths which carry the cutting fluid to the multiple cutting sites of the tool are formed by the central bore of the cutter head, the central pilot boss of the adapter received in the inner end of the cutter head bore, and a cap received in the outer end of that bore and spaced from the flat cutting face to permit the radial escape of the cutting fluid across the face of the cutter head to grooves in the peripheral rim of the cutter head leading to the rake face of each cutting bit of the cutter.

DESCRIPTION OF THE DRAWINGS

The invention is described in connection with the accompanying drawings, in which.

DETAILED DESCRIPTION OF THE INVENTION

Figure 1:
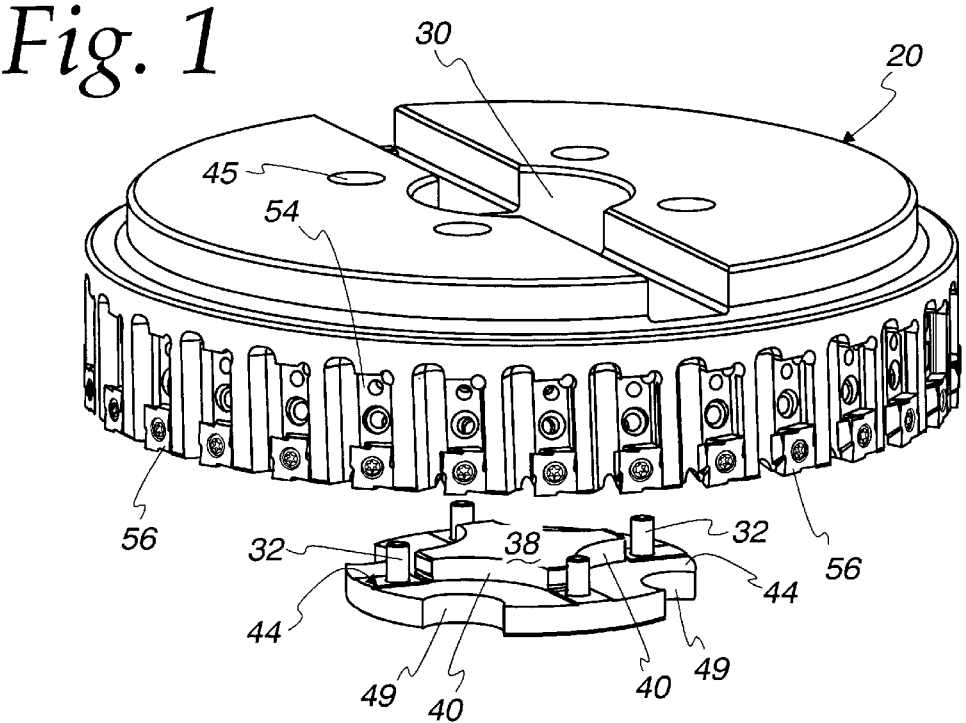
FIG. 1 is an oblique isometric drawing of a face mill cutter head embodying the invention, seen there from the front as a partial exploded assembly view.
Figure 2:
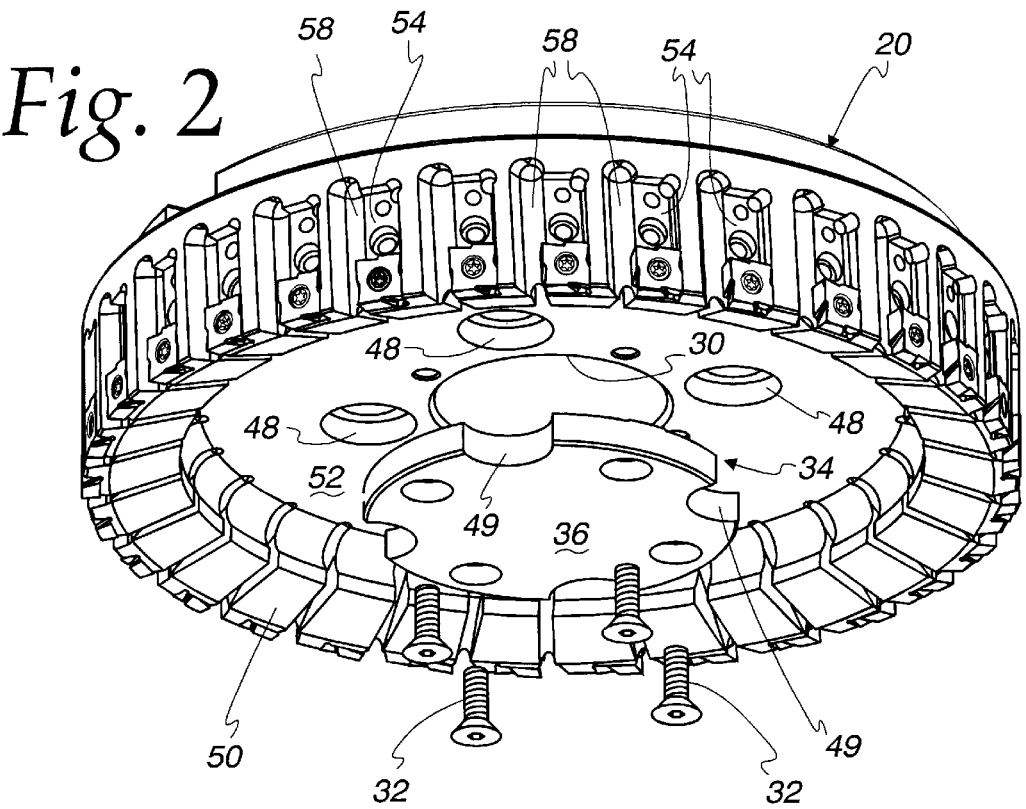
FIG. 2 is a similar exploded oblique isometric view of the same seen from the rear.
Figure 3:
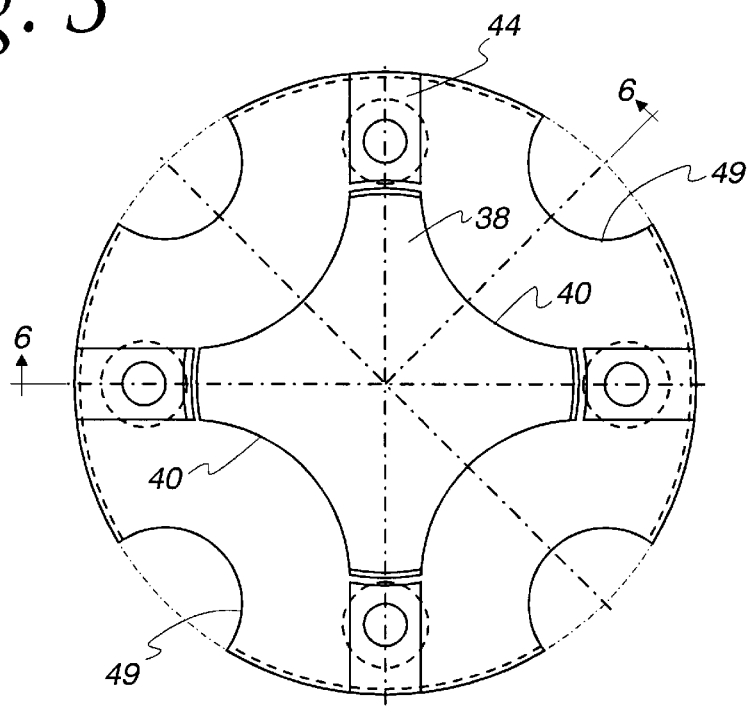
FIG. 3 is an elevational view of the underside of the well cap seen with the cutter head in FIGS. 1 and 2.
Figure 4:
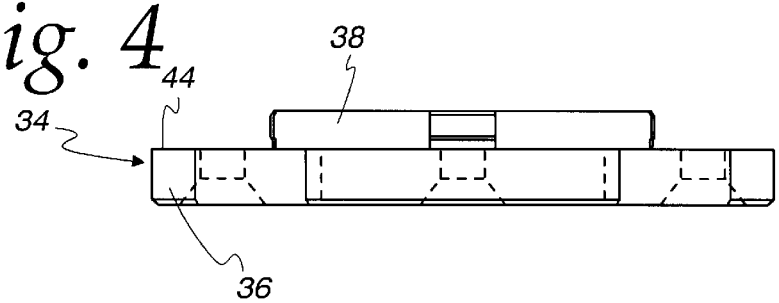
FIG. 4 is a side view of the well cap of FIG. 3.
Figure 5:
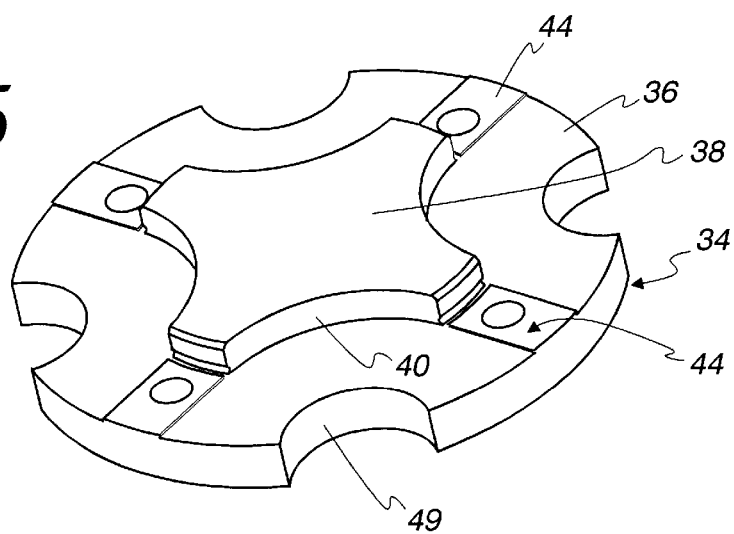
FIG. 5 is an isometric view of the well cap shown in FIGS. 3 and 4.
Figure 6:
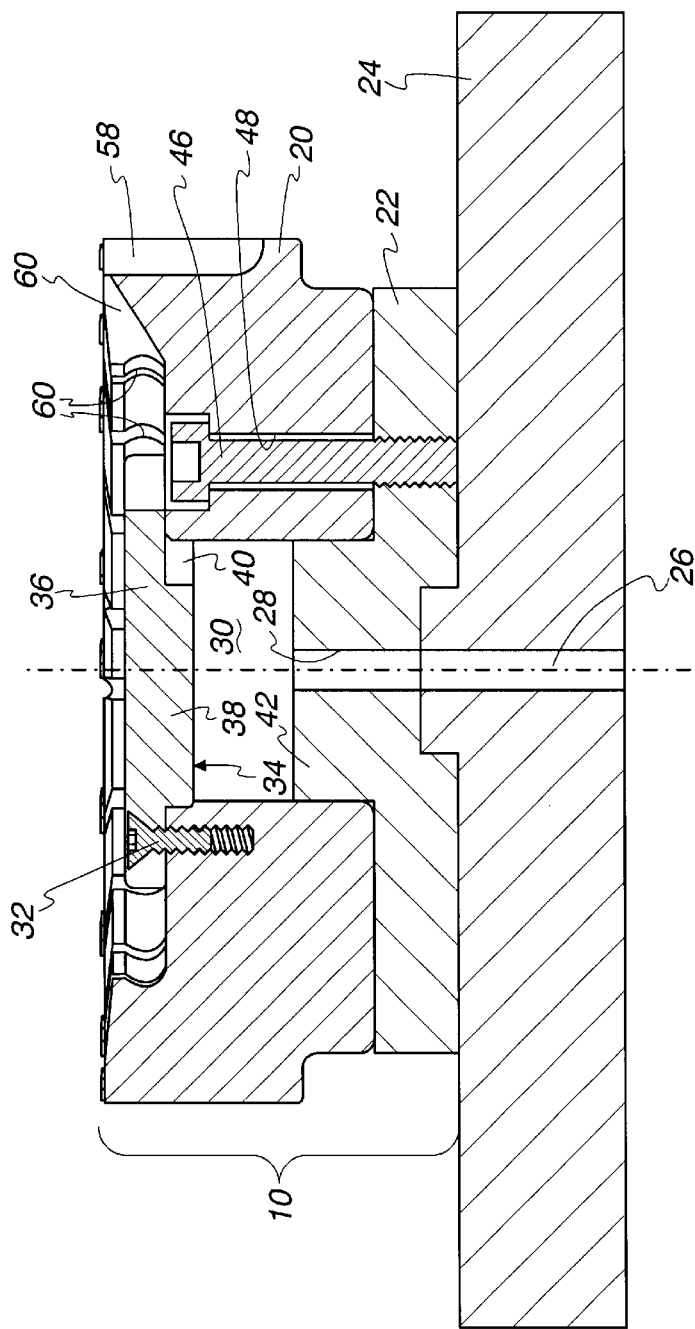
FIG. 6 is a cross-sectional view of the cutter head, well cap, adapter plate, and spindle face in assembled relation, taken as though along the angled broken line 6—6 of FIG. 3.

The invention is here illustrated in one preferred embodiment, namely the cutter head 20 of a face mill 10, the exterior of which is seen from front, side, and back in FIGS. 1 and 2, and the internal construction of which will be evident from the cross-sectional view of FIG. 6, which shows the cutter head 20 in assembly with an intermediate adapter plate 22 secured by conventional means to the face 24 of the spindle of the milling head (not shown), which drives and wields the cutter.

Aligned axial passages 26 and 28 in the spindle face 24 and adapter plate 22, respectively, supply cutting fluid under pressure to a central bore 30 in the cutter head 20.

Figure 7:
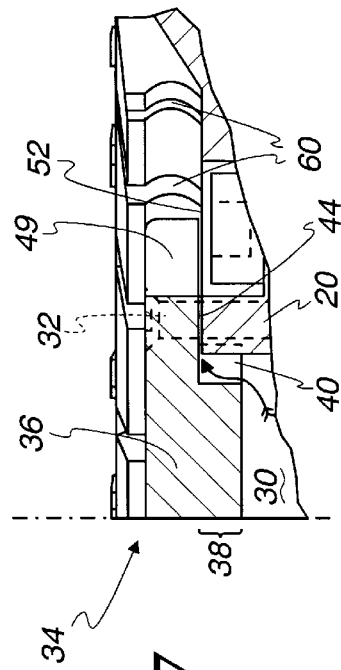
FIG. 7 is a fragmentary enlargement of the right half of FIG. 6, made to show by exaggeration the flow path of the cutting fluid in the clearance space between the well cap and the face of the cutter head.

Secured by screws 32 to the top of the cutter head 20 in FIGS. 6 and 7 is a closure 34 for the well 30. The closure 34 comprises a circular cap 36 having on its underside an integral center plug 38 which is received into the central bore 30 of the cutter head 20 in the assembly.

About its periphery, the center plug 30 is indented radially by four equispaced cut-outs 40 which reduce the central plug 38 essentially to a four-armed spider which remains clear of the pilot boss 42 of the adapter plate 22 to form therewith a manifold chamber communicating with the four cut-outs 40.

The circular cap 36 of the well closure 34 has on its underside, aligned with the residual arms of the center plug 38, four integral pads 44 of small dimension axially of the cutter body. Countersunk screw holes in the cap 36 in the center of each pad 44 receive the screws 32 which secure the closure 34 to the cutter head 20, with the underside of the cap 36 spaced from the flat face of the cutter head 20 by the thickness of the pads 44, leaving a clearance space beneath the cap 36 which serves as a channel of increasing dimension radially of the cutter head.

The cutter head 20 is held in assembled relation with the adapter plate 22 by four cap screws 46 seated in counter-bored through holes 48 in the cutter head and received in aligned threaded holes in the adapter plate (FIG. 6). To provide access to the screw holes 48 from the face of the cutter head 20, the cap 36 of the well closure 34 is notched in its periphery at 49 in alignment with the screw holes 48, avoiding the necessity of removing the well closure 34 in order to disassemble the cutter head 20 from the adapter plate 22 for routine service, i.e., the indexing and/or replacement of the cutting inserts which are served by the cutting fluid, and to which attention will now be turned.

The cutter head 20, as shown in FIGS. 1 and 2, is essentially a disc having a substantial peripheral rim 50 on the side of the cutter head which addresses the workpiece, which may be referred to as the cutter face 52, and which has a flat central area within the rim 50.

The periphery of the cutter head is milled to provide multiple tool bit emplacements, each comprising a recess or pocket 54 of generally rectangular configuration having its long axis aligned approximately parallel to the rotational axis of the cutter head, but leaning slightly away from the cutting direction of rotation to provide clearance for the axially facing cutting edges of the cutting inserts 56 therein. The inserts are normally supported axially of the cutter head within the pockets 54 by insert seats (not shown in FIGS. 1 to 7) in turn supported by the bottom wall of the pocket 54, as the insert 56 and its supporting seat are backed by the rear wall of the pocket, which is open to its front side, i.e., in the cutting direction of rotation, to a more deeply milled chip gullet 58 to receive the chips taken from the workpiece by the end and side cutting edges of the insert.

Figure 8:
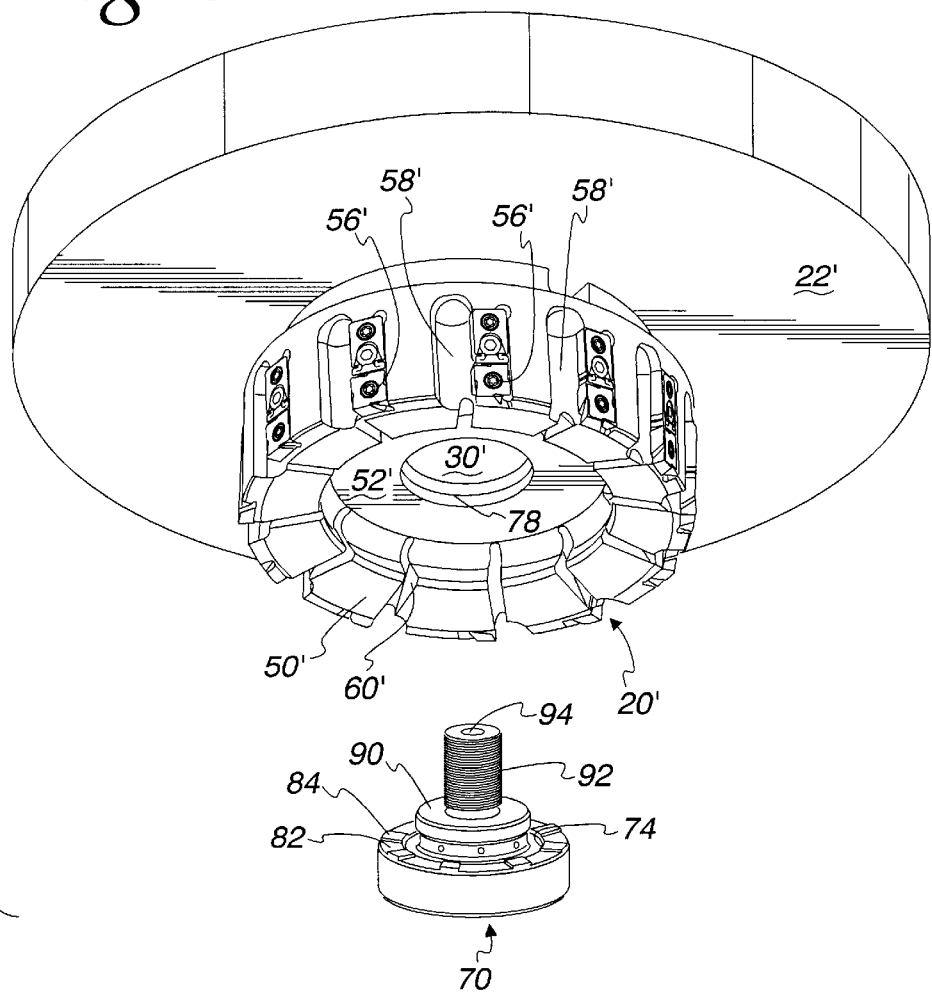
FIG. 8 is an exploded isometric assembly drawing of another embodiment of the invention applied to cutters of smaller diameter.
Figure 10:
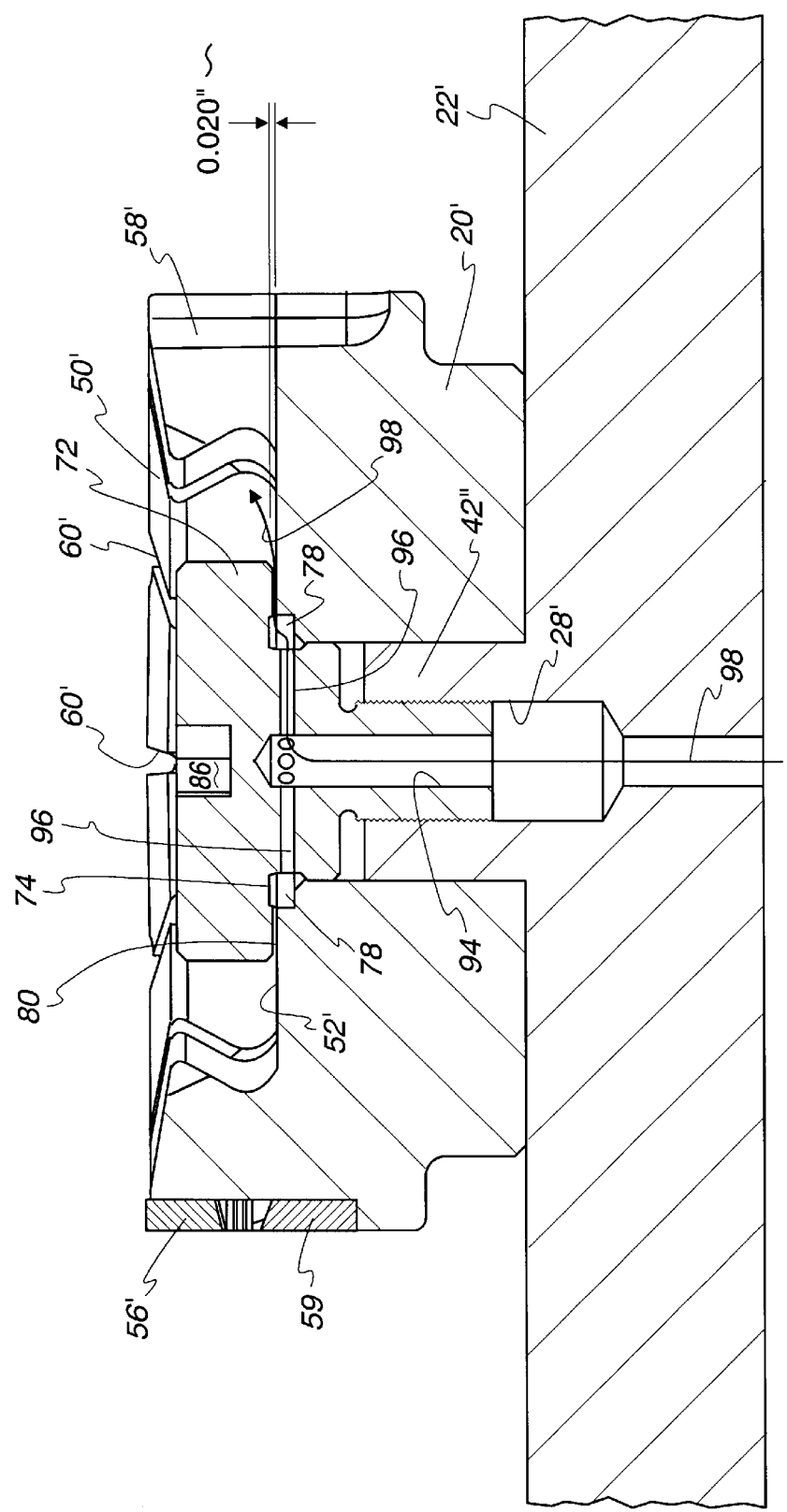
FIG. 10 is a centerline cross section of the assembly of FIG. 8, illustrating the path of cutting fluid from the central bore of the pilot boss of the adapter plate to the face of the cutter head and thence to the rake face of each cutting insert.

The insert seat, in its form and its relation to the cutter head 20 and the insert 56, although illustrated in FIGS. 8 and 10 hereof, is shown only incidentally, as it is the subject of my co-pending patent application Ser. No. 09/773,862 filed contemporaneously herewith, and forms no part of the invention of this application.

Returning to the cutting fluid distribution system, the upstanding rim 50 about the face 52 of the cutter head, is milled to provide upwardly-inclined radial slots 60 extending from the face 52 to each of the chip gullets 58 at their upper ends (FIGS. 1 and 6). Thus, as the cutter head 20 is rotated by the machine spindle, and cutting fluid is supplied to central bore 30 of the cutter body under pressure through the conduits 26 and 28, it is manifolded by the central bore to the cut-outs 40 of the central plug of the well closure 34, and then escapes radially outwardly through the clearance space between the cap 36 and the face 52 of the cutter body, proceeding as a sheet or film of fluid until it reaches the rim 50.

Portions of the cutting fluid, under centrifugal force, are forced up the sloping channels 60 to bathe and cool the cutting inserts 56, lubricate the cut of the inserts engaged against the workpiece, and flush the chips accumulating in the chip gullets 58 to facilitate their departure from the chip gullets by centrifugal force as the inserts clear the cut.

A portion of the cutting fluid also escapes over the top of the rim 50, as two distinct spray cones have been seen to occur at operating speeds, which, in the case of milling aluminum, may run to 4,000 surface feet per minute.

As earlier noted, the enlargement of a portion of FIG. 6 as FIG. 7 purposely exaggerates the clearance space between the cap 36 and the face 52 of the cutter head for the sake of illustrating the fluid flow path clearly. In an actual case of an eight-inch diameter face mill, that clearance space was held to a maximum of 0.018", determined by the thickness of the pads 44 on the underside of the cap 36. That clearance space, related to the pressure of the entering fluid, is intended to produce a throttling effect sufficient to assure reasonably uniform distribution from the central well manifold to each chamber formed between the cut-outs 40 and the wall of the central bore 30 of the cutter head, to assure reasonably uniform flow across the cutting face of the cutter head to the multiple cutting inserts.

Figure 9:
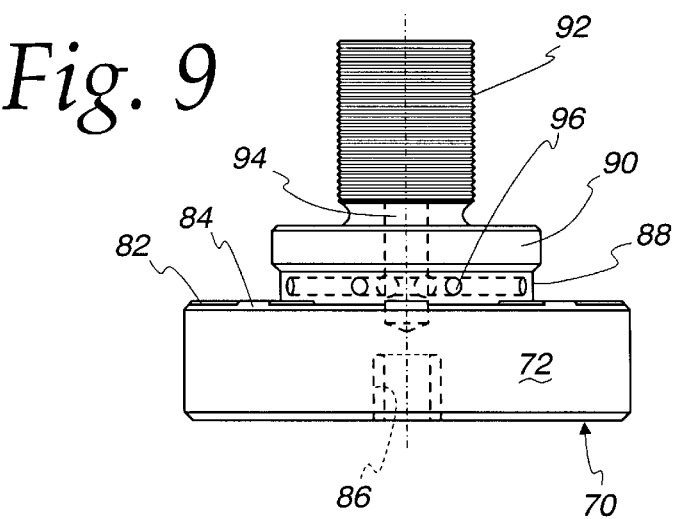
FIG. 9 is an enlarged side elevation view of the cap screw alone, of FIG. 8.

The embodiment of FIGS. 8, 9, and 10, as earlier noted, is an adaptation of the fluid distribution system of the larger face mill of FIGS. 1 to 7 to milling cutters of smaller diameter, e.g., four inches. In the smaller diameter version the well closure 34, its attaching screws 32, and the cap screws 46 for securing the cutter head 20 to the adapter plate 22, are combined in a specially adapted cap screw 70, which, when assembled with the cutter head 20' and the adapter plate 22', provides the cutter fluid distribution system, delivering to the face 52' of the cutter head 20' a film of cutting fluid which proceeds by centrifugal force to the rim 50' and through the slots 60' to bathe the cutting inserts 56' and the chip gullets 58' about the periphery of the cutter head 20'.

The special cap-screw closure 70 (FIGS. 8 and 9) incorporates a large flat cap or head 72, larger in diameter than the central bore 30' of the cutter head 20' and overlying the radially inner half of the face 52' of the cutter head (FIG. 10). The underside of the screw head 72 is undercut axially at 74 in opposition to a counterbore 76 of comparable radial extent in the central bore 30' of the cutter head. Together, the undercut 74 of the screw head 72 and the counterbore 76 form an annular reservoir chamber 78 (FIG. 10). Radially outwardly of the peripheral ring 80 formed by the undercut 74, the underside of the head 72 is milled to the lesser axial depth of some twenty thousandths inches (0.020") to provide shallow radial channels 82 between stand off pads 84 (FIGS. 8 and 9) when the latter meet the face 52' of the cutter head as the screw closure 70 is tightened into holding contact with the cutter head, using an Allen wrench in the central hexagonal socket 86 of the screw head.

Adjacent to the enlarged head 72, the screw is undercut radially in a shallow ring 88 to define a plug 90 which substantially closes the central bore 30' of the cutter head 20', while the necked down ring 88 serves to increase the radial dimension of the annular reservoir chamber 78 (FIG. 10).

The cap screw 70 is drilled on its axis through an integral threaded shank 92 extending from the plug 90 to form a blind central conduit 94 which is penetrated by multiple holes 96 drilled radially into the screw in the undercut 98. The holes 96 communicate with the annular chamber 78.

In the case of the smaller diameter cutter, the central hole 28' of the adapter plate 22' is counterbored and threaded within the pilot boss 42' to receive the threaded shank 92 of the cap screw 70. When the three parts, i.e., adapter plate 22', cutter head 20', and cap-screw 70, are assembled (FIG. 10), the cutting fluid path, depicted by the arrow 98, is upward in FIG. 10 through the aligned central bores 28' and 94 of the adapter plate 22' and cap screw 70, respectively, then radially outwardly through the holes 96 to the annular chamber 78 surrounding the cap screw 70 on the underside of its head 72.

The chamber 78 manifolds the several holes 96, serving as a collector ring and as a spinning reservoir from which the cutting fluid, emanating under pressure from the spindle, is further pressurized by centrifugal force to escape through the radial channels 82 on the underside of the cap screw head 72 to flow across the face 52' of the cutter on its way to bathe, cool, and lubricate the peripheral cutting inserts 56'.

As with the escape channels formed on the underside of the cap 36 of the well closure 34 of the first-described embodiment, the flow path of the cutting fluid of the smaller cutter of FIGS. 8 to 10 is made and unmade with each assembly and disassembly of the cutter head with the adapter plate for routine maintenance, i.e., the indexing and replacement of the cutting inserts, resulting in the automatic and incidental maintenance of the cutting fluid channels from the pressurized source in the spindle to the face of the cutter head.

The features of the invention believed new and patentable are set forth in the following claims.

What is claimed is:

1. A system for delivering cutting fluid from a pressurized source to the multiple cutting edges of a rotary milling cutter, comprising:

a generally cylindrical, rotary cutter body having a mounting end and an opposite cutting face, and being adapted for driving attachment of its mounting end to an adapter plate mountable on the face of a machine spindle, said cutter body having a central bore which receives a pilot boss of the adapter plate to form therewith a central well, a closure for said central well comprising a cap of diameter greater than that of said central well having an integral central plug protruding from the underside thereof insertable into and securable in the open end of said well, said cap also having on its underside radially outwardly of said plug a plurality of bosses to limit the insertion of said plug into the well by their engagement with said cutting face and to maintain a shallow interrupted annular space between the underside of said cap and said cutting face, to accommodate fluid flow radially outwardly along said cutting face, one of said plug and said cutter body being relieved to form with the other a fluid reservoir communicating with said shallow space and with the fluid source, said cutting face being surrounded by an integral, axially upstanding rim, said cutter body having multiple peripheral emplacements for cutting bits and said rim having therein a channel between said cutting face and each emplacement to convey cutting fluid from said cutting face to the cutting bits by centrifugal force.

2. The system of claim 1 wherein the cutting face within said upstanding rim is largely planar and perpendicular to the rotational axis, and the channels in the rim are open slots sloping axially away from said cutting face and said mounting end and merging into each said emplacement in front of the cutting bit therein.

3. The system of claim 2 wherein said reservoir comprises spaces formed between said bore and said plug by peripheral indentations of the plug, and said spaces communicate with the fluid source through said central bore.

4. The system of claim 3 wherein the insertion of said plug into said well is maintained by screws passing through said cap and received in threaded holes in the cutter body.

5. The system of claim 4 wherein said screws pass through the bosses on the underside of the cap.

6. The system of claim 2 wherein said reservoir is formed by a counterbore of said central bore and the communication of said reservoir with said pressurized fluid source occurs through multiple radial passages in said plug communicating with an axial passage therein open to said fluid source.

7. The system of claim 6 wherein said closure includes a central stem integral with and extending from said plug, said stem being threaded for reception by threads in a central passage of said pilot boss communicating with said fluid source and the axial passage of said plug extending through said stem, whereby the closure takes the form of a cap screw for maintaining the assembly of cutter body and adapter plate, the cap thereof being adapted to receive a wrench to turn the screw.

8. The system of claim 6 wherein said cap is undercut axially on its underside in opposition to said counterbore to facilitate the fluid flow from said reservoir through said shallow space to said cutting face.

9. The system of claim 7 wherein said cap is undercut axially on its underside in opposition to said counterbore to facilitate the fluid flow from said reservoir through said shallow space to said cutting face, and said plug is undercut radially adjacent the underside of said cap and in opposition to said counterbore, said undercuts enlarging the reservoir formed by said counterbore.

* * * * *